Jan. 10, 1950  C. C. FUERST  2,494,042
CAMERA SHUTTER TRIGGER LOCK
Filed Feb. 27, 1947

CARL C. FUERST
INVENTOR

BY *Newton M. Perrins*
*Finell H. Stewart*
ATTORNEYS

Patented Jan. 10, 1950

2,494,042

UNITED STATES PATENT OFFICE 2,494,042

CAMERA SHUTTER TRIGGER LOCK

Carl C. Fuerst, Rochester, N. Y., assignor to Eastman Kodak Company, Rochester, N. Y., a corporation of New Jersey Application February 27, 1947, Serial No. 731,261

10 Claims. (Cl. 95—63)

1

This invention relates to photography and more particularly to camera shutters. One object of the invention is to prevent the operation of a shutter trigger until the mechanism which completes the operation of the shutter release started by the trigger is set. Another object of my invention is to provide a power-operated shutter release with a means for controlling the shutter trigger in accordance with the position of the power-operated release. A still further object of the invention is to provide a safety device for shutter releases, and other objects will appear from the following specification, the novel features being particularly pointed out in the claims at the end thereof.

In shutters of the type employing a power-operated shutter relase such as shown in my co-pending applications Ser. No. 595,033 for photographic shutter, filed May 21, 1945, now Patent No. 2,448,876, dated September 7, 1948, and Ser. No. 683,515 for Camera shutter with automatic diaphragm, filed July 13, 1946, now Patent No. 2,472,580, dated June 7, 1949, unlike the usual shutters, the shutter trigger does not, in itself, release the shutter mechanism. In order to provide a smooth and easy release, these shutters are equipped with a power-operated shutter release which is preferably driven by a motor spring; this release being set each time the shutter is set and being held in a set position by means of a latch member. When the latch member is moved a short distance from its latching position by the trigger, the power-operated release continues the movement of the arm which formerly latched the power-operated member against actuation, so that the spring member finally releases the shutter. In such shutters, it is, of course, necessary that the power-operated release member be completely set before the shutter can be actuated and it is, therefore, desirable to have some means of notifying an operator that such is the case. Accordingly, in accordance with my present invention, I have provided cooperating elements on the power-operated release and trigger for holding the latter against movement except at such times as when the power-operated release is fully set.

Camera shutters are known in which the shutter trigger is definitely latched until a master member is set, examples of such shutters being shown in Patents Nos. 2,105,228, Riddell, January 11, 1938, and 2,267,518 Burger, December 23, 1941. In each of these shutters the shutter trigger latch cooperates with a power-operated master member which drives the shutter itself

2 and with the trigger, so that the trigger cannot be depressed until the shutter is set. My present invention differs from these in that the trigger cannot be depressed unless the power-operated shutter release has first been set because, unless the power-operated release has been set, the shutter cannot be released at all.

Coming now to the drawings wherein like reference characters denote like parts throughout:

Figure 1:
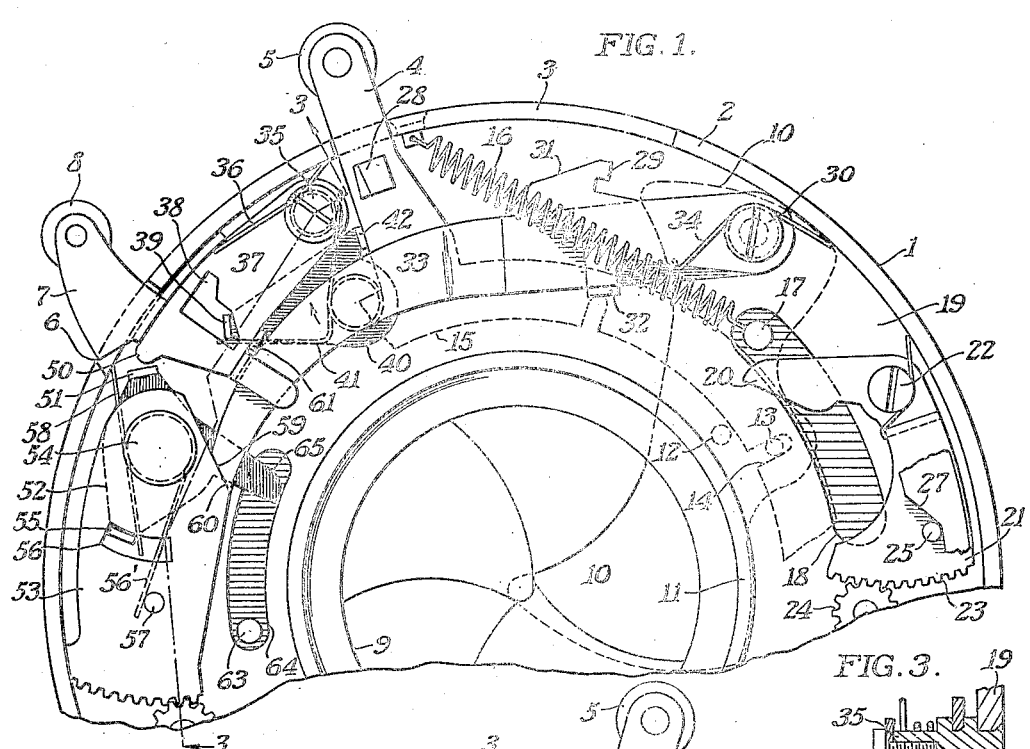
Fig. 1 is a fragmentary plan view of a shutter with the cover and certain other parts removed illustrating a trigger latch controlled by a power-operated shutter release; these parts being constructed in accordance with and embodying a preferred form of my invention. The trigger is shown in its latched position in this figure.

My invention comprises broadly providing a latch, or abutment, on a portion of a power-operated shutter release which is adapted to lie in the path of a trigger and prevent the operation of the trigger in a shutter-releasing direction unless the power-operated shutter release has been tensioned and is ready to take over the releasing movement of the shutter-release latch after the completion of the movement of the shutter trigger. In the type of shutter referred to, the trigger cannot, in itself, move the shutter release a sufficient distance to complete the releasing movement.

More specifically, my shutter may consist of the usual casing 1 having an upstanding flange 2 around its periphery, this flange being slotted at 3 to permit the movement of a setting lever 4 which may be operated by the handle 5 and being slotted at 6 to permit the trigger 7, which may be operated by a handle 8, to be moved from the outside of the shutter casing. The shutter 1 has a central opening 9 covered by shutter leaves 10 through which light passes to make an exposure and there is preferably a threaded cell 11 to receive one of the lens elements. The shutter leaves 10 are pivotally mounted on studs 12 and have a pin 13 and slot 14 connection with a blade ring 15; this bade ring including the radially-extending arm 4 terminating in the operating handle 5. A power-spring 16 is connected to the blade ring 15 through the medium of a pin 17 extending upwardly through a slot 18 in the mechanism plate 19. This pin may also contact with a cam 20 on a gear segment 21 pivoted on a stud 22 and having teeth 23 meshing with a gear-train gear 24, as is shown and more fully described in my copending application above referred to. The gear segment 21 may have an upstanding pin 25 which may be moved to and from a position lying in the path of the pin 17 by a cam 27.

The arm 4 carries a lug 28 which forms one latch element, a second latch element being formed by the latch member 29 pivoted upon a stud 30 and having a beveled surface 31 and an upstanding lug 32 which limits the motion of this first latch member relative to a second latch member 33 also pivoted on the stud 30. A spring 34 normally holds the latch elements in the position shown in Fig. 1, but this spring also permits the lug 28 to strike the beveled surface 31 and cam the latch member downwardly when the arm 4 is moved to its set position.

Figure 2:
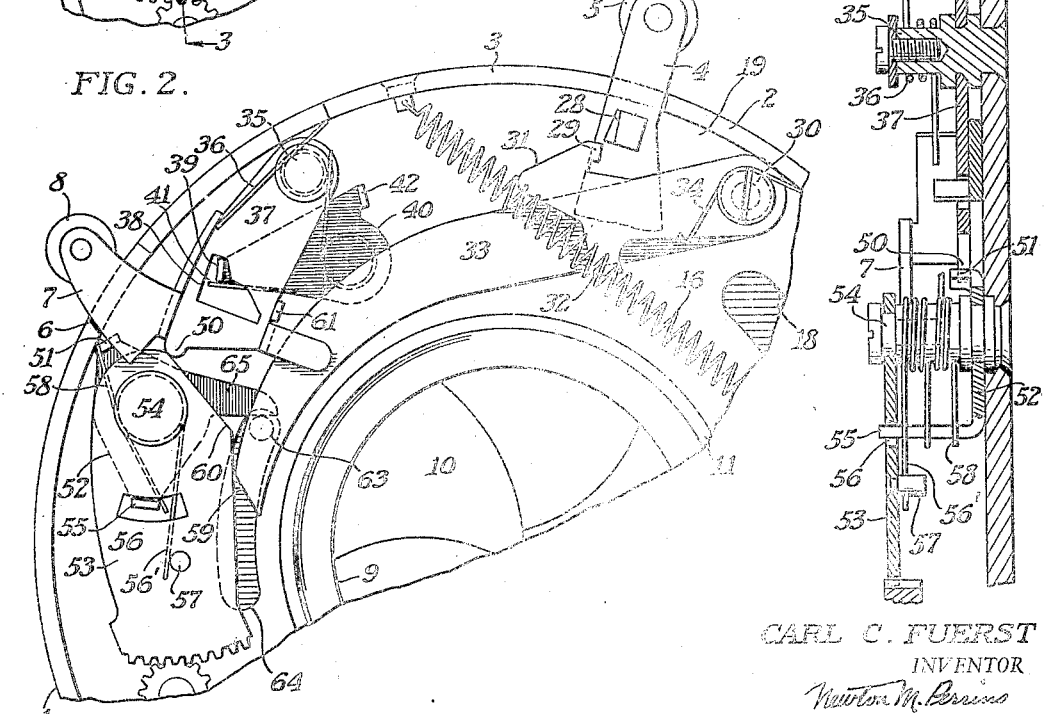
Fig. 2 is a view similar to Fig. 1 but with the parts shown in their released position, the trigger having been depressed and the blade ring latch having just been moved to a released position from which the setting member may now move to its Fig. 1 position to make an exposure.
Figure 3:
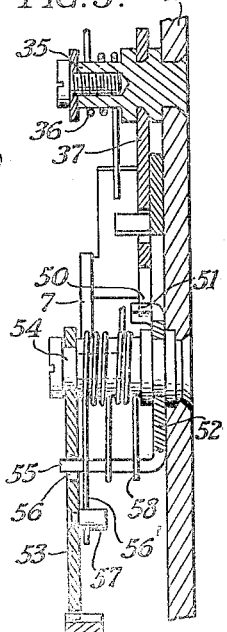
Fig. 3 is a fragmentary detail section taken on line 3—3 of Fig. 1.

The trigger 7 is pivoted on a stud 35 and a spring 36 normally holds this trigger outwardly in the position shown in Fig. 1. The trigger arm 37 is provided with a cam slot 38 into which an upstanding end 39 of a latch 40 may extend; this latch being normally thrust in the direction shown by the arrow in Fig. 1 by a spring 41. When the trigger is depressed, it is latched down by the latch member 40, as is shown in Fig. 2. However, since the latch member 40 has an upstanding lug 42 lying in the path of the arm 4, after an exposure has been made and when the arm reaches its Fig. 1 or rest position, it strikes lug 42, moving the latch 40 into its unlatched position shown in Fig. 1.

The trigger arm has a rounded protuberance 50 which, as shown in Fig. 1, may project into such a position that it may be engaged by an upstanding lug 51 carried by the bell crank portion 52 of the power-operated shutter release; the other portion of which 53 cooperates with the bell crank member 52 in the following manner. Both of the power-operated release parts 52 and 53 are coaxially pivoted on a stud 54. Member 52 has an upstanding lug 55 passing upwardly through a slot 56 in member 53. Consequently, the movement of the two parts is limited by this lug and slot. A power spring 56 rests against the stud 57, encircles the stud 54 and rests against the upstanding lug 55. This spring, therefore, tends to hold the parts in the position shown in Fig. 1 and a second spring 58 normally holds the power-operated shutter release in the rest position shown in Fig. 1. In this position the release does not have the power stored in spring 56′ for operating the release lever 33; this lever having a beveled end 59 resting on the beveled surface 60 of the power-operated release so that the release is held against movement. However, if the trigger could be pressed down from its Fig. 1 position, the trigger lug 61 would engage the lever 33 and move it a short distance but the shutter could not be released because the extent of movement of the trigger is insufficient to move the latch 29 off of the latch element 28. Since the spring 56′ is not tensioned, the shutter would not be released so that nothing would happen.

In order to avoid this, the lug 51 is so arranged that when the bell crank lever 52 is in its inoperative rest position the lug 51 lies in the path of the lug 50 and, consequently, the trigger handle 8 cannot be depressed. This occurs, of course, as long as the spring 56 does not have the power stored in it which occurs when the handle 5 is moved to the right to set the power spring 16. When this occurs, a lug 63 (which extends upwardly from the blade ring 15 to which arm 4 is attached) swings upwardly through the slot 64 with reference to Fig. 1 until the pin engages the bell crank arm 65, at which time the power release bell crank lever 52 is rotated in a counter-clockwise direction to its Fig. 2 position, although in this position since an exposure has just been made, the power release member 53 has moved. When the setting occurs, the power-operated section 53 remains in its Fig. 1 position because it has been latched there by the latch elements 59 and 60 so that as the bell crank is swung counter-clockwise, the spring 56′, which is a heavy spring, is tensioned and will remain tensioned as long as arm 4 remains either latched or towards the right-hand end of slot 3 with reference to the drawings. As soon as this upward movement of arm 65 occurs, lug 51 must, of course, also move counter-clockwise and, in so doing, it passes out of the path of the lug 50 as this lug moves about its pivot. Consequently, the shutter is now ready to make an exposure. A downward pressure upon the trigger handle 8 moves lug 61 a distance insufficient to release latch 29—28. The latch surfaces 59 and 60 change relative to each other as latch arm 33 moves in a counter-clockwise direction by the force imparted to it through the trigger.

It will be noticed that the latch elements 59 and 60 lie only slightly off a dead center between the pivotal points 30 and 54. In this rest position, the power-operated element cannot move but when the latch element 59 is slid down the latch element 60 only a short distance by means of the trigger, the latch elements pass further from a dead center between the pivots 54 and 30 until the power-operated element under the influence of spring 56′ can take over and continue the movement of the latch arm 33. This movement continues until the lug 32 pulls the latch 29 beneath the latch 28, this point of release being shown in Fig. 2. As soon as this occurs, the arm 4 of the blade ring flies rapidly to the left, with respect to Fig. 2, moving the blades 10 through the blade ring 15 to make an exposure.

When the pin 63 moves away from the arm 65, this section of the power-operated release is released and the spring 56′ will rapidly return the upstanding lug 55 to the left-half end of the slot 56, as shown in Fig. 1, so that the second spring 58 may restore the parts to their Fig. 1 position in which position the latch 33 moves upwardly under the impulse of its spring 34 restoring the latch elements 59 and 60 to their latch position.

With the construction above referred to, it will be obvious that if for any reason the power-operated shutter release spring 56′ has not been properly set before the trigger is depressed, it cannot be depressed because of the relationship of lug 51 and lug 50 on the trigger. However, if the trigger is held down, as it will be by the latch 40, and is released only after the parts have reached their Fig. 1 position, the trigger spring 36 may cause the lug 50 to snap past the lug 51 since motion of the bell crank 52 relative to the segment 53 is, of course, permitted by the spring 56′. It is only when the pin 63 has thrown the bell crank 52 into its Fig. 2 position that the path of the trigger lug 50 is clear so that it may be moved to a releasing position. Spring 36 is relatively strong and can readily overcome the much weaker spring 58 which tends to hold the power-operated release in the Fig. 1 position. Spring 36 is also strong enough to overcome spring 56' so that regardless of the position of the parts, trigger 7 may move to its normal position of rest in Fig. 1.

I claim:

1. In a shutter trigger latch for shutters of the type including an apertured casing, pivotally mounted shutter blades therein, a blade ring operably connected to the shutter blades, a driving spring connected to the blade ring, a blade ring latch and means for releasing the latch comprising a trigger and a power-operated shutter release, the combination with said power-operated shutter release including two relatively-movable parts, a spring between the two parts adapted to be set, a pin on the blade ring for moving one part to set the spring as the blade ring driving spring is set, and means carried by said one part and movable therewith to and from the path of the trigger for holding the trigger against movement until the spring between the two parts of the power-operated shutter release is set.

2. In a shutter trigger latch for shutters of the type including an apertured casing, pivotally mounted shutter blades therein, a blade ring operably connected to the shutter blades, a driving spring connected to the blade ring, a blade ring latch and means for releasing the latch comprising a trigger and a power-operated shutter release, the combination with said power-operated shutter release including two relatively-movable parts, a spring between the two parts adapted to be set, a pin on the blade ring for moving one part to set the spring as the blade ring driving spring is set, and means carried by said one part normally lying in the path of the trigger to prevent movement thereof, but movable therefrom by setting the blade ring.

3. In a shutter trigger latch for shutters of the type including an apertured casing, pivotally mounted shutter blades therein, a blade ring having a pin-and-slot connection with the blades and a setting lever thereon, a driving spring connected to the blade ring and shutter, a blade ring latch, the combination with said latch, of means for releasing said latch comprising a trigger and a power-operated shutter release each movably mounted for coaction to release said latch, said power-operated shutter release comprising two pivotally mounted parts, one including a pivotally mounted segment movable to operatively engage and move said latch, the other a pivotally mounted bell-crank lever, a spring between the parts for moving one from the other, means on the trigger for moving the latch, said trigger and a latch part having interengaging surfaces for blocking movement of the trigger when the power-operated shutter release and the trigger are in one position, and a pin carried by the blade ring movable by the setting lever thereon for engaging one part of the two-part, power-operated shutter release for moving said part from a blocking position as the shutter is set.

4. The shutter trigger latch defined in claim 3 characterized by the parts of the two-part, power-operated release being pivoted on a single stud.

5. The shutter trigger latch defined in claim 4 in which a pin carried by the blade ring may move the bell-crank lever, tensioning the spring between the parts as the bell-crank lever moves through its pin-and-slot connection with the segment as the shutter is set simultaneously, moving the blocking inter-engaging surface on the bell-crank lever from the interengaging surface on the trigger.

6. The shutter trigger latch defined in claim 4 in which a pin carried by the blade ring may move the bell-crank lever, tensioning the spring between the parts as the bell-crank lever moves through its pin-and-slot connection with the segment as the shutter is set simultaneously, moving the blocking interengaging surface on the bell-crank lever from the iterengaging surface on the trigger, and in which a cam surface on the segment is moved to a position to engage and hold the blade ring latch in an operative latching position with the blade ring and its driving ring set, ready for an exposure.

7. The shutter trigger latch defined in claim 3 characterized by the movement of the setting lever which releases the trigger from the power-operated shutter release, also tensioning the spring between the power-operated shutter release parts, and in which the trigger may then be moved to move said latch, the latch and trigger having paths of movement such that the trigger may move the latch only a part of the distance necessary to release the latch.

8. The shutter trigger latch defined in claim 3 characterized by the movement of the setting lever which releases the trigger from the power-operated shutter release, also tensioning the spring between the power-operated shutter release parts, and in which the trigger may then be moved to move said latch, the latch and trigger having paths of movement such that the trigger may move the latch only a part of the distance necessary to release the latch, the power-operated release also engaging the latch and completing movement thereof after the latch is initially moved by the trigger.

9. The shutter trigger latch defined in claim 3 characterized by the parts of the two-part, power-operated release being pivoted on a single stud, and characterized by a second spring tending to move the bell-crank lever towards its blocking position, and a third spring tending to move the trigger to a position of rest in which it may be blocked by the bell-crank lever, the third spring being strong enough to move the bell-crank lever to permit the trigger to move past the bell-crank lever in moving to its rest position.

10. In a shutter trigger latch for shutters of the type including an apertured casing, pivotally mounted shutter blades therein, a blade ring having a pin-and-slot connection with the blades and a setting lever thereon, a driving spring connected to the blade ring and shutter, a blade ring latch, the combination with said latch, of means for releasing said latch comprising a trigger and a power-operated shutter release each movably mounted for coaction to release said latch, said power-operated shutter release comprising two pivotally mounted parts, one including a pivotally mounted segment movable to operatively engage and move said latch, the other a pivotally mounted bell-crank lever, a spring between the parts for moving one from the other, means on the trigger for moving the latch, said trigger and a latch part having interengaging surfaces for blocking movement of the trigger when the power-operated shutter release and the trigger are in one position, a pin-and-slot connection between the bell-crank lever and the segment, a spring between these parts, tending to hold them in a rest position, a spring tending to move both parts in one position, and a spring on the trigger of a strength to move the trigger to a rest position causing the interengaging parts of the trigger and bell crank to snap past one another as the trigger is moved by its spring to its rest position.

CARL C. FUERST.

REFERENCES CITED

The following references are of record in the file of this patent:

UNITED STATES PATENTS

| Number | Name | Date |
|---|---|---|
| 2,267,518 | Burger | Dec. 23, 1941 |
| 2,412,681 | Fuerst | Dec. 17, 1946 |